July 31, 1934.  H. L. DRIFTMEYER  1,968,600
ELECTRICAL WINDING
Filed June 9, 1933
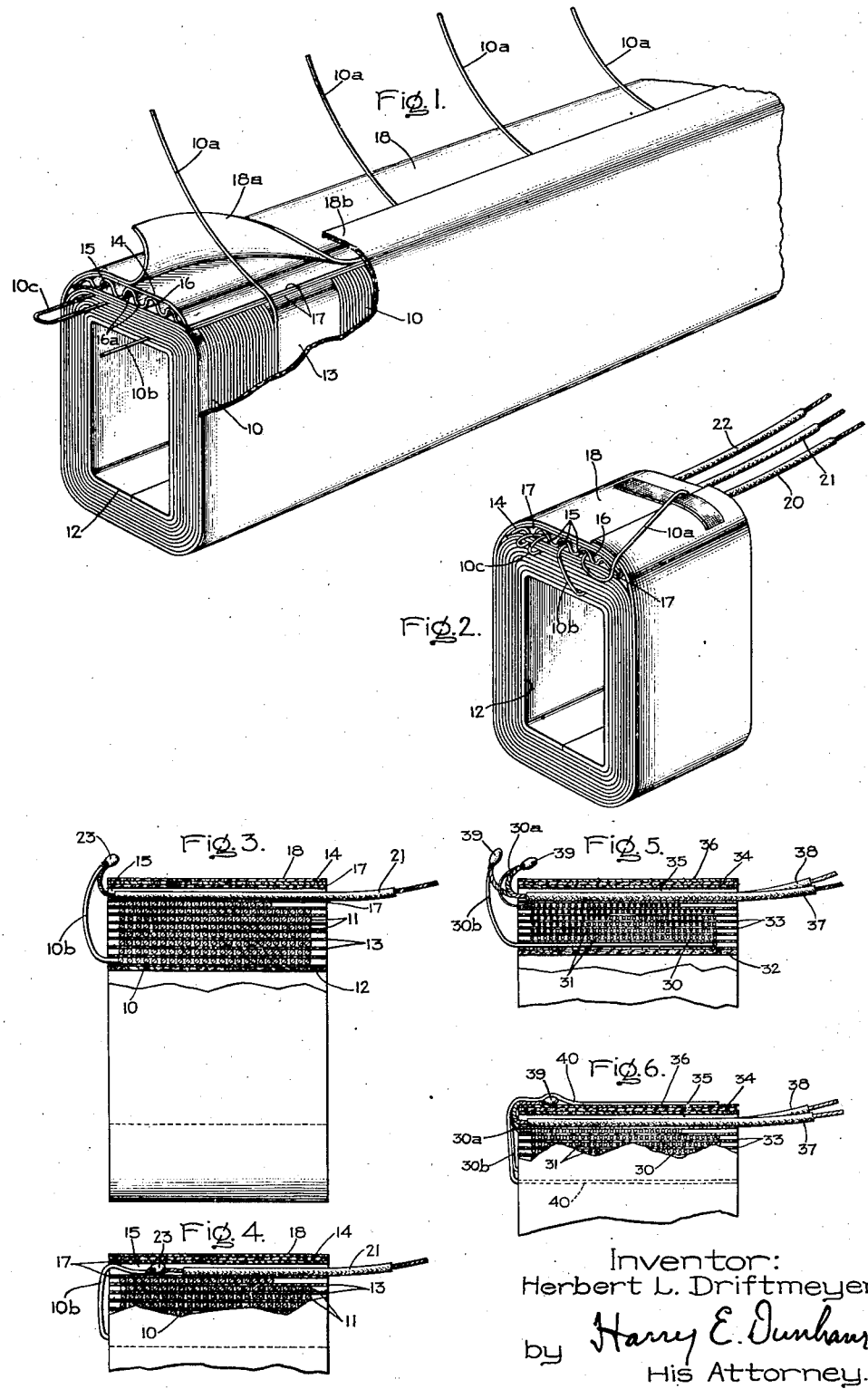
Inventor:
Herbert L. Driftmeyer,
by Harry E. Dunham
His Attorney.

Patented July 31, 1934

1,968,600

UNITED STATES PATENT OFFICE 1,968,600

ELECTRICAL WINDING

Herbert L. Driftmeyer, Fort Wayne, Ind., assignor to General Electric Company, a corporation of New York Application June 9, 1933, Serial No. 675,026

8 Claims. (Cl. 175—21)

This invention relates to electrical windings, and it has for its object the provision of improved method and means for connecting leads to a winding of this character.

Heretofore, some difficulty has been experienced with the leads provided for electrical windings, especially when the winding is formed of a very fine conductor, which has very little mechanical strength, because of the tendency for the leads to tear the conductor when pulling forces are applied to the leads.

In windings where rather fine conductors are used, it is important in order to prevent damage to the wound conductor and winding, that the leads be securely anchored to the winding so that any pulling force applied to the leads will be absorbed by the leads and their anchorages, rather than by the relatively weak conductor to which the leads are attached.

This invention in one of its aspects contemplates the provision of improved method and means for anchoring leads to an electrical winding, whereby an improved winding is provided, and moreover, one which is comparatively easy and inexpensive to make.

This invention further contemplates the provision of means for protecting the mechanical and electrical joints between the leads and the wound conductor, and electrically insulating the leads, one from the other.

In accordance with this invention, a member formed with passageways for the leads is secured to the winding. In layer wound coils, this member preferably will be arranged on the winding so as to rest on the outermost layer of turns and so that its passageways extend longitudinally of the winding. A corrugated paper having closed grooves or passageways may be used conveniently.

The leads are directed through the passageways, and their inner ends are joined electrically and mechanically with the electrical conductor which is used to form the winding. A portion of each lead, preferably, the inner end portion of the lead including the electrical and mechanical joint with the conductor, is folded over the adjacent end of the member provided with the passageway receiving the lead. This folded portion engages this member so as to securely anchor the lead to the winding. By reason of this arrangement, the anchorage for the lead will absorb any pulling force applied to the lead so as to relieve both the wound conductor and the joint between the conductor and the lead from mechanical strains.

The folded portions of the leads are provided with a suitable protective covering.

In one form of this invention, wherein a relatively heavy and mechanically strong conductor is used to form the winding, and hence, where there is little danger involved of injuring the winding by pulling on the leads, the joints between the leads and the winding are positioned in the passageways, rather than being folded back over them. In this form, the portions of the winding adjacent the joints and leads are folded over the member in which the passageways are provided so as to anchor the leads.

In both forms, the passageways function to locate and protect the leads, and further, to electrically insulate them, one from the other.

For a more complete understanding of this invention, reference should be had to the accompanying drawing in which Fig. 1 is a perspective view illustrating a plurality of windings which have been formed simultaneously on a common winding spool, and illustrating a member positioned on the winding and provided with passageways for receiving suitable leads for the windings arranged in accordance with this invention; Fig. 2 is a perspective view of a completed electrical winding arranged in accordance with this invention; Fig. 3 is a view in elevation of the winding shown in Fig. 2, portions being shown in section so as to illustrate certain structural details; Fig. 4 is a view similar to Fig. 3, but illustrating the winding at a more advanced stage in its construction; Fig. 5 is a view in elevation of an electrical winding illustrating a modified form of this invention, portions being shown in section so as to illustrate certain structural details; and Fig. 6 is a view similar to Fig. 5, but illustrating the winding at a more advanced stage of its construction.

Referring to Figs. 1–4 inclusive, this invention is shown in one form as applied to an electrical winding of the layer wound type wherein a relatively heavy and mechanically strong electrical conductor is used. The finished winding, as shown, Figs. 2 and 4, comprises a conductor 10 wound into a plurality of superposed layers 11 arranged longitudinally of the winding. These layers 11 are wound upon a spool 12, and are separated one from the other by sheets 13 composed of a suitable electrically insulating material, such as paper. The spool 12 may also be and preferably will be formed of paper.

Arranged on the uppermost layer is a member 14 having a plurality of spaced passageways 15 arranged longitudinally of the winding. This member preferably will be formed of corrugated paper having enclosed grooves or passageways. As shown, this member is formed of a central member 16 having alternate ridges and grooves 16a. This central member is sandwiched between and secured to two outer sheets 17. This member 14 is rigidly secured to the winding by means of a strip 18 formed of paper, or some other suitable material, that is folded completely about the winding and secured to the winding by means of an adhesive or some other suitable means.

A suitable lead 20 is provided for the end 10a of the winding at the upper layer of turns, and a lead 21 is provided for the end 10b of the winding at the lower layer of turns. If desired, a lead 22 may be secured to a portion 10c of the conductor 10 lying in an intermediate layer of the winding. These leads are mechanically and electrically connected with their respective portions 10a, 10b and 10c of the conductor 10 by means of suitable joints 23. These joints 23 may be formed in any suitable manner, as by welding, soldering or brazing. The joint 23 between the lead 21 and the end 10a of the winding is shown in Figs. 3 and 4. In the finished winding, as shown in Figs. 2 and 4, the leads are received in separate passageways 15, 16a in the member 14, and so are the electrical and mechanical joints 23 between the leads and those portions of the conductor 10 immediately next to these joints.

In this form of the invention shown in Figs. 1-4, the member 14 functions to guide the leads to their respective portions of the winding to which they are attached, to separate and thereby electrically insulate the leads, and to protect the electrical and mechanical joints 23 between the leads and the winding. The portions 10a, 10b and 10c of the conductor 10 folded into the passageways 15 function to anchor their respective leads.

In making the finished electrical winding shown in Figs. 2 and 4, it is preferable to form a plurality of the windings at the same time. For this purpose, a relatively long spool 12 is used and the windings are wound upon the spool at spaced intervals. It will be understood that the spool 12 will be supported by a suitable arbor (not shown) in a suitable winding machine (also not shown) which will function to wind a plurality of coils upon the spool. It will also be understood that when a set of layers has been wound, these layers will be covered by an elongated sheet of insulating material 13, and then another set of layers will be wound upon this sheet, and so on until the desired number of layers have been wound.

After the windings have thus been formed, an elongated sheet of the corrugated paper 14 will be placed upon the uppermost layer, as shown in Fig. 1.

Then this corrugated sheet 14 will be secured to the winding by an elongated sheet of the paper 18 folded completely about the windings so that the ends 18a and 18b of the sheet overlap, as clearly shown in Fig. 1. The sheet 18 will be secured to the corrugated paper 14 and to the winding by means of a suitable adhesive, or it may be secured to them in any other suitable manner.

The ends 10a of the conductors at the final layers wound, that is the uppermost layers, will be brought out to the exterior of the windings between those folded end portions of the paper 18, as clearly shown in Figs. 1 and 2.

After the windings have thus been formed, the coils will be separated by means of suitable cutting knives, which will be operated to cut through the portions of the corrugated paper 14 and insulating sheets 13 between the wound coils so as to sever the windings one from the other.

After the windings have thus been separated, the leads 20, 21 and 22 for each winding will be inserted into one end of the passageways 15 of the winding and passed through them so that the inner ends of the leads project from the opposite ends of the passageways. These inner ends of the leads will then be electrically and mechanically connected to their respective portions 10a, 10b and 10c of the conductor 10 by the joints 23 which may be made in any suitable manner, as by welding, soldering, brazing, etc. As shown in Figs. 3 and 4, the end 10b of the conductor 10 at the lower end of the winding is directed upwardly from the lower layer and then is mechanically and electrically connected with its lead 21 by means of the joint 23. The end 10a of the conductor from the upper layer is brought out to the exterior of the winding between the folded end portions 18a and 18b of the sheet 18 at the right hand end of the winding, as shown in Fig. 2, and is directed back to the other end of the winding where it is connected with its lead 20 by means of a joint similar to the joint 23. The lead 22 is connected to its conductor portion 10c by means of a similar joint. It will be understood that the portion 10c will be drawn out from its layer, as shown in Fig. 1, so that it may be conveniently secured to its lead 22.

It will be observed that the portions 10a, 10b and 10c of the conductor which are electrically connected to the leads are folded into the passageways 15, the conductor 10a being folded from the outer surface of the winding and into its passageway 15, while the portions 10b and 10c are directed upwardly over lower layers and folded into their passageways 15. These folded portions function to anchor the leads 20, 21 and 22 to the winding.

After the three leads 20, 21 and 22 have been connected to their respective conductors 10a, 10b and 10c, the leads will be pulled outwardly toward the right, as viewed in Fig. 2, so as to pull the joints 23 into the passageways 15 and likewise those portions of the conductor immediately next to the joints 23.

In Figs. 5 and 6, this invention is shown as applied to an electrical winding that is formed of a relatively fine and hence mechanically weak electrical conductor. In this winding the portions of the leads adjacent the electrical and mechanical joints between the leads and the conductor are arranged so as to anchor the leads to the winding.

As shown in Figs. 5 and 6, a relatively fine electrical conductor 30 is wound into a plurality of layers 31 on a suitable spool 32. The layers 31 are electrically insulated by sheets of insulating material 33 made of any suitable electrically insulating material, such as paper. A suitable member 34 provided with passageways 35 is positioned upon the outermost layer of turns so that the passageways 35 lie longitudinally of the winding. The member 34 may be constructed in identically the same fashion as is the member 14 of Figs. 1-4 inclusive. This member is secured to the winding by means of a sheet 36 formed of paper, or some other suitable material, wrapped about the winding and secured to it by means of a suitable adhesive.

Leads 37 and 38 are provided for the ends 30a and 30b of the conductor 30 at the upper and lower layers of the winding respectively. These leads are threaded through separate passageways 35 in the member 34, and have their inner ends electrically and mechanically connected with the ends 30a and 30b of the conductor by means of suitable joints 39, which may be joined in any suitable manner as by welding, brazing, soldering, etc.

As shown in Fig. 6, the portions of the conductor 30 and the leads 37 and 38 immediately next to the joints 39 are folded back over the member 34 at the inner ends of the passageways 35. These folded portions are rigidly secured in place upon the winding by means of a suitable sheet 40, formed of any suitable material, such as paper, wrapped about the winding and the spool, as indicated in Fig. 6; as shown in this figure, the sheet 40 is applied to the upper surface of the member 34 and is directed over the folded sections of the leads and conductor including the joints 39 and then is directed downwardly over the side of the winding to the inner surface of the spool 32. It will be understood that the sheet 40 will be secured to the winding in any suitable manner, such as by means of an adhesive.

It will be observed in view of the foregoing construction that the folded portions of the leads securely anchor the leads to the winding so that the leads and their anchorages will absorb any pulling or tensioning forces applied to the leads. This structure completely relieves the conductor 30 of any mechanical strains whatsoever as a result of forces applied to the leads.

Thus, in this form of the invention, the member 34 functions to separate and electrically insulate the leads, one from the other, and to securely anchor the leads so as to protect the relatively fine conductor 30 from mechanical strains and injuries that might otherwise occur by forces applied to the leads.

The windings shown in Figs. 5 and 6 will preferably be made in a manner similar to the winding shown in Figs. 1–4. Thus, it is preferable to form a plurality of the windings in the same winding operation and then sever the windings after they have been wound.

After the windings have been severed, the leads 37 and 38 for a winding will be threaded through the passageways 35 provided for them in the member 34 attached to the winding and will have their inner ends secured to the conductor portions 30a and 30b by means of welding, brazing, or soldering, so as to provide the joints 39.

After this operation, the portions of the leads and the conductor portions 30a and 30b next to the joints 39 will be folded over the member 34, as indicated in Fig. 6, so as to securely anchor the leads to this member. After this, the sheet 40 will be applied by means of a suitable adhesive.

In both forms of this invention it will be observed that the leads are located and are electrically insulated from each other by the passageways provided in the members 14 and 34 of the two forms of the invention, and that the electrical joints 23 and 39, between the leads and the conductors of the two forms, respectively, are provided with a protective covering, the joints 23 being received in the passageways 15, while the joints 39 are protected by the sheet 40. It will also be observed that in each case the leads are securely anchored to the winding. In Figs. 5 and 6, the anchorage between the leads 37 and 38 of the winding is such as to relieve the relatively fine conductor 30 from any mechanical strains resulting from pulling on the leads.

While this invention has been illustrated as applied to an electrical winding formed of a conductor wound into a plurality of superposed layers, it will be understood that it is equally applicable to other forms of winding, such as the random wound coil wherein the turns are wound haphazardly.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An electrical winding comprising an electrical conductor wound into a plurality of turns, a member provided with a passageway, and a lead for said winding directed through said passageway and connected with said conductor and having a portion folded back over a wall of said passageway so as to anchor said lead to said winding.

2. An electrical winding comprising an electrical conductor wound into a plurality of layers, a member provided with a passageway supported on said winding, a lead for said winding in said passageway, a portion of said lead being folded back over one end wall of said member so as to anchor said lead to said winding, and an electrical and mechanical connection between said lead and one end of said conductor.

3. An electrical winding comprising an electrical conductor wound into a plurality of layers, a member provided with a passageway supported on said winding, a lead for said winding in said passageway and means providing an electrical and mechanical joint between the inner end of said lead and one end of said conductor, portions of said lead and conductor including said joint being folded back over the edge of said passageway at the inner end of said lead so as to anchor said lead to said winding.

4. An electrical winding comprising a spool, a conductor wound into a plurality of layers on said spool, means for electrically insulating said layers, a member on the uppermost of said layers provided with a plurality of passageways arranged longitudinally of said winding, a plurality of leads for said winding, each directed through one of said passageways, means providing mechanical and electrical joints between the inner ends of said leads and different layers of said conductor, and means for anchoring said leads to said winding comprising folded portions of said leads including said joints turned back over said member at the ends of said passageways adjacent the inner ends of said leads.

5. An electrical winding comprising a spool, a conductor wound into a plurality of layers on said spool, sheets of insulating material between said layers, a sheet of corrugated material resting on the uppermost of said layers, means securing said sheet of material to said winding, leads for said winding directed through the grooves of said sheet, mechanical and electrical joints between the inner ends of said leads and conductors connected with the inner and outer layers of said winding and an intermediate layer of said winding, the portions of said conductors and leads including said joints being folded over the upper walls of said grooves at the inner ends of said leads.

6. An electrical winding comprising a spool, an electrical conductor wound into a plurality of layers on said spool, sheets of paper insulating material between said layers, a sheet of corrugated paper having closed passageways resting on the uppermost of said layers, a sheet of paper folded over said corrugated sheet and secured to said winding so as to secure said corrugated sheet to said winding, leads for said winding directed through the passageways of said corrugated sheet, mechanical and electrical joints between the inner ends of said leads and conductors connected with the inner, the outer and an intermediate layer of said winding, the portions of said conductors and leads including said joints being folded over the walls of said paper defining said passageways at the inner ends of said leads so as to anchor said leads to said winding.

7. An electrical winding comprising an electrical conductor wound into a plurality of turns, a sheet of corrugated material having enclosed passageways secured to said winding, leads for said winding directed through separate passageways of said member and electrical and mechanical joints between said leads and said conductor located in said passageways.

8. The method of securing electrical leads to an electrical winding which consists in securing to said winding a member having passageways therein, directing said leads through said passageways, connecting the inner ends of said leads to said winding to provide electrical joints between said leads and said winding, and folding the portions of said leads including said joints over the walls of said member defining said passageways so as to anchor said leads to said winding.

HERBERT L. DRIFTMEYER.